United States Patent
Lee et al.

(10) Patent No.: US 10,135,053 B2
(45) Date of Patent: Nov. 20, 2018

(54) METHOD OF MANUFACTURING POROUS SEPARATOR COMPRISING ELASTIC MATERIAL, POROUS SEPARATOR MANUFACTURED BY THE METHOD, AND SECONDARY BATTERY COMPRISING THE SEPARATOR

(71) Applicant: LG Chem, Ltd., Seoul (KR)

(72) Inventors: Joo-Sung Lee, Daejeon (KR);
Byoung-Jin Shin, Daejeon (KR);
Dong-Wook Sung, Daejeon (KR);
Jong-Hun Kim, Daejeon (KR)

(73) Assignee: LG Chem, Ltd. (KR)

(*) Notice: Subject to any disclaimer, the term of this patent is extended or adjusted under 35 U.S.C. 154(b) by 774 days.

(21) Appl. No.: 14/452,787

(22) Filed: Aug. 6, 2014

(65) Prior Publication Data
US 2014/0342238 A1 Nov. 20, 2014

Related U.S. Application Data

(63) Continuation of application No. PCT/KR2013/008601, filed on Sep. 25, 2013.

(30) Foreign Application Priority Data

Sep. 25, 2012 (KR) .................. 10-2012-0106545
Sep. 25, 2013 (KR) .................. 10-2013-0114158

(51) Int. Cl.
*H01M 2/16* (2006.01)
*H01M 2/14* (2006.01)
(Continued)

(52) U.S. Cl.
CPC ....... *H01M 2/1653* (2013.01); *B29C 47/0011* (2013.01); *B29C 47/0019* (2013.01);
(Continued)

(58) Field of Classification Search
CPC .................. H01M 2/14; H01M 2/145
See application file for complete search history.

(56) References Cited

U.S. PATENT DOCUMENTS 6,296,969 B1* 10/2001 Yano ............. H01M 2/1613
429/144
2005/0087487 A1* 4/2005 Sakamoto ......... B01D 67/002
210/500.36
(Continued)

FOREIGN PATENT DOCUMENTS

JP 2008210791 A 9/2008
JP 2012003938 A 1/2012
(Continued)

OTHER PUBLICATIONS

International Search Report for PCT/KR2013/008601 dated Jan. 22, 2014.
(Continued)

*Primary Examiner* — Ula C Ruddock
*Assistant Examiner* — Matthew W Van Oudenaren
(74) *Attorney, Agent, or Firm* — Lerner, David, Littenberg, Krumholz & Mentlik, LLP

(57) ABSTRACT

Disclosed is a method of manufacturing a porous separator including an elastic material, and a separator manufactured by the method. The separator includes an elastic material being uniformly dispersed in a polymer at a weight ratio of 40:60 to 5:95, and a value of elongation at break in a low tensile strength direction at room temperature is greater than or equal to 250%. In addition, the method of manufacturing a porous separator includes forming an extruded sheet by extruding a mixture of a polymer and an elastic material at a weight ratio of 95:5 to 60:40, forming a film by annealing and stretching the extruded sheet, and forming a porous separator by heat setting the stretched film. Accordingly, a thermal shrinkage ratio of the film is reduced and an
(Continued)

elongation at break is greatly increased, to provide a porous separator with improved stability.

4 Claims, 1 Drawing Sheet

(51) Int. Cl.
| | | |
|---|---|---|
| *B29C 47/00* | (2006.01) | |
| *B29C 55/06* | (2006.01) | |
| *B29C 71/02* | (2006.01) | |
| *B29C 55/00* | (2006.01) | |
| *B29C 47/14* | (2006.01) | |
| *B29C 47/20* | (2006.01) | |
| *B29C 47/40* | (2006.01) | |
| *B29C 47/92* | (2006.01) | |
| *B29K 23/00* | (2006.01) | |
| *B29K 105/00* | (2006.01) | |
| *B29K 105/04* | (2006.01) | |

(52) U.S. Cl.
CPC ......... *B29C 47/0057* (2013.01); *B29C 47/14* (2013.01); *B29C 47/20* (2013.01); *B29C 47/40* (2013.01); *B29C 47/92* (2013.01); *B29C 55/005* (2013.01); *B29C 55/06* (2013.01); *B29C 71/02* (2013.01); *H01M 2/145* (2013.01); *B29C 2071/022* (2013.01); *B29C 2947/92704* (2013.01); *B29K 2023/06* (2013.01); *B29K 2023/12* (2013.01); *B29K 2105/0088* (2013.01); *B29K 2105/04* (2013.01); *B29K 2995/0051* (2013.01)

(56) References Cited

U.S. PATENT DOCUMENTS

| | | |
|---|---|---|
| 2007/0009803 A1 | 1/2007 | Kim et al. |
| 2008/0269366 A1* | 10/2008 | Shaffer .................. C08L 53/02 |
| | | 521/134 |
| 2009/0269672 A1 | 10/2009 | Takita et al. |
| 2011/0262814 A1 | 10/2011 | Ikemoto et al. |
| 2011/0308586 A1 | 12/2011 | Yamazaki |
| 2013/0316246 A1* | 11/2013 | Fujimoto .................. C08J 5/18 |
| | | 429/249 |

FOREIGN PATENT DOCUMENTS

| | | |
|---|---|---|
| JP | 2012023348 A | 2/2012 |
| KR | 20070005341 A | 1/2007 |
| KR | 20080063792 A | 7/2008 |
| KR | 101025394 B1 | 3/2011 |
| KR | 20110089438 A | 8/2011 |
| WO | 2012105660 A1 | 8/2012 |
| WO | WO2012105660 * | 8/2012 |

OTHER PUBLICATIONS

Lg Chem : "LUCENE LC100," Oct. 8, 2009 (Oct. 8, 2009), XP055216380, Retrieved from the Internet: URL:http://km.ncmchem.com/uploadfiles/product_images/e514e687-db89-4d98-904b-c87c2d674784.pdf[retrieved on Sep. 28, 2015].

Extended Search Report from European Application No. 13842195.3, dated Oct. 6, 2015.

* cited by examiner

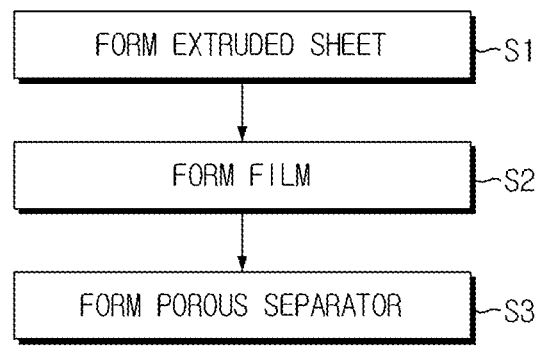

METHOD OF MANUFACTURING POROUS SEPARATOR COMPRISING ELASTIC MATERIAL, POROUS SEPARATOR MANUFACTURED BY THE METHOD, AND SECONDARY BATTERY COMPRISING THE SEPARATOR

CROSS-REFERENCE TO RELATED APPLICATION

The present application is a continuation of International Application No. PCT/KR2013/008601 filed on Sep. 25, 2013, which claims priorities to Korean Patent Application No. 10-2012-0106545 filed in the Republic of Korea on Sep. 25, 2012, and Korean Patent Application No. 10-2013-0114158 filed in the Republic of Korea on Sep. 25, 2013, the disclosures of which are incorporated herein by reference.

TECHNICAL FIELD

The present disclosure relates to a method of manufacturing a porous separator, and more particularly, to a method of manufacturing a porous separator including an elastic material, a porous separator manufactured by the method, and a secondary battery including the separator.

BACKGROUND ART

A secondary battery is a chemical battery that can be used semipermanently by continuously repeating charge and discharge using an electrochemical reaction, and can be classified into a lead storage battery, a nickel-cadmium battery, a nickel-hydrogen battery, and a lithium secondary battery. Among them, a lithium secondary battery has a higher voltage and better energy density characteristics than the others, and thus is taking the lead in the secondary battery market. Also, depending on the type of an electrolyte, a lithium secondary battery can be divided into a lithium ion secondary battery using a liquid electrolyte and a lithium ion polymer secondary battery using a solid electrolyte.

A lithium secondary battery includes a cathode, an anode, an electrolyte, and a separator, and among them, the separator plays a role of separating the cathode from the anode to electrically isolate the cathode and the anode and to improve the transfer of lithium ions or permeability based on a high porosity to increase ionic conductivity. As a polymer substrate of a generally used separator, a polyolefin-based polymer having advantageous properties for pore formation, chemical resistance, and excellent mechanical and thermal properties, such as polyethylene (PE), polypropylene (PP), and the like, is mainly used.

A separator for a lithium secondary battery requires characteristics such as excellent permeability, low thermal shrinkage, high puncture strength, and the like; however, with the advancement of a high-capacity high-output battery, attempts to improve permeability are continuously being conducted. To manufacture a porous separator from polyolefin, a wet process that mixes polyolefin and a pore forming agent at high temperature, extrudes, and stretches, and subsequently, extracts the pore forming agent have been used. However, to improve permeability of a separator manufactured through the wet process, a way of increasing an amount of the pore forming agent, for example, a diluent, a plasticizer, and the like, have been used; however, as the content of the pore forming agent increases, stability of extrusion molding greatly reduces, difficulties occur since alterations have to be made to various process conditions including extrusion conditions, and environmental issues are raised due to a great amount of pore forming agents and solvents.

Meanwhile, in contrast to a wet process using a solvent, a dry process without using a solvent enables mass production of a wide film and is more environmentally friendly than the wet process because there is no need for a solvent. However, a stretching process has a drawback in that a possibility of a short circuit occurring is high due to the tendency of a film shrinking in a direction opposite of its stretched direction.

Accordingly, a film having passed through a stretching process has significant improvements in terms of mechanical properties such as a tensile strength in a stretched direction or a more stretched direction, but has a relatively low strength in a direction perpendicular to its stretched direction or a less stretched direction, so that the film may be torn out, resulting in a short circuit. Also, an internal short circuit may occur when the separator shrinks excessively due to increased temperature caused by overcharge or other reasons.

Accordingly, there is still a demand for a porous separator in which a stretched film has improved strength in a stretched direction as well as a direction opposite to its stretched direction.

DISCLOSURE

Technical Problem

The present disclosure is directed to providing a porous separator in which a film has a significant reduction in susceptibility to tears in a battery during or after a battery assembly process, and a method of manufacturing the same.

Technical Solution

To achieve the object, according to one aspect of the present disclosure, there is provided a porous separator including a mixture of an elastic material and a polymer resin at a content ratio of about 40:60 to about 5:95 based on a weight ratio, in which in the mixture, the elastic material is uniformly dispersed in the polymer, and a value of elongation at break in a low tensile strength direction at room temperature is greater than or equal to about 250%.

According to another aspect of the present disclosure, there is provided a method of manufacturing a porous separator including forming an extruded sheet by extruding, through an extruder, a mixture of a polymer resin and an elastic material at a weight ratio of 95:5 to 60:40, forming a film by annealing and stretching the extruded sheet, and forming a porous separator by heat setting the stretched film.

Advantageous Effects

According to the present disclosure, a thermal shrinkage ratio of a film is reduced and an elongation at break is greatly increased, to provide a porous separator with improved stability

DESCRIPTION OF DRAWINGS

FIG. 1 is a flowchart illustrating a process of preparing a porous separator according to an exemplary embodiment.

MODE FOR DISCLOSURE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

The term "permeability" as used herein represents a period of time during which an air of 100 cc passes through a porous substrate, and as its unit, sec/100 cc is used in the specification. The term "permeability" may be interchangeably used with the term "transmittance", and is generally indicated according to a Gurley value.

The term "puncture strength" as used herein represents a resistance of a separator against external danger, for example, a passage of an external object, and "gram (g)" is used as its unit. The term "puncture strength" may be interchangeably used with the term "piercing strength" or "burst strength", and generally, a higher value lowers the risk of internal short circuits caused by a separator.

The term "elongation at break" as used herein represents a ratio between a changed length and an initial length after a separator breaks when stretched at room temperature, and "%" is used as its unit. The elongation at break may be measured through a tensile test.

A porous separator according to one aspect of the present disclosure includes a polymer resin in which an elastic material is uniformly dispersed.

A content ratio between the elastic material and the polymer resin is from about 40:60 to about 5:95 or from about 30:70 to about 10:90 based on a weight ratio. When the elastic material is dispersed in the polymer resin within the content range, a value of elongation at break in a low tensile strength direction at room temperature may be about 250% or higher or about 300% or higher.

For example, the polymer resin is a raw material particle for a separator provided between a cathode and an anode of a secondary battery to prevent a short circuit by maintaining an insulation condition, and as a non-limiting example, may be a polyolefin-based polymer resin. For example, the polyolefin-based polymer resin may be any one selected from polyethylene, for example, high-density polyethylene, linear low-density polyethylene, low-density polyethylene, or ultra-high molecular weight polyethylene, polypropylene, polybutylene, and polypentene, or combinations thereof, but is not limited thereto.

In the present disclosure, generally, the elastic material represents a material having an elastic property that can be stretched up to more than double its original length under stress and return to its original length promptly when the applied stress is removed.

The elastic material may include, but not limited to, an elastomer, a natural rubber, or a synthetic rubber. As a non-limiting example, the elastomer may include a polyolefin-elastomer (POE), a styrenic block copolymer (SBC), a vinyl chloride elastomer, a chlorinated polyethylene elastomer (CPE), a urethane elastomer (TPU), a polyester elastomer (TPEE), a polyamide elastomer (TPAE), a fluorinated elastomer, and a silicone elastomer.

Among them, the polyolefin elastomer (POE) may be any one polymer selected from the group consisting of olefin, for example, ethylene, propylene, butylene, pentene, hexene, heptene, and octane, or two or more polymers, for example, a copolymer, a terpolymer, or a mixture thereof, or a copolymerized elastomer therewith, or a graft copolymer in which one species of monomer selected from a group consisting of ethylene, propylene, butylene, pentene, hexene, heptene, and octane, has a backbone chain structure and different species of monomer is grafted thereto in a form of a branch. According to an embodiment of the present disclosure, the polyolefin elastomer may be an ethylene-octane copolymer. According to another embodiment of the present disclosure, the polyolefin elastomer may be a copolymer, a terpolymer, a block copolymer, or a graft copolymer polypropylene, including polypropylene in a main chain.

According to one embodiment of the present disclosure, the polyolefin elastomer has a melting temperature (Tm) of 90° C. to 165° C. When the melting temperature is 90° C. or less, heat resistance is reduced, making it unsuitable tier use as a separator of an electrochemical device.

The porous separator according to one embodiment of the present disclosure is uniaxially stretched, for example, in a machine direction (MD), or biaxially stretched.

Here, the uniaxial stretch represents stretching a film in one direction, and the biaxial stretch represents stretching a film in two directions approximately perpendicular to one another. This stretching process is performed to form pores in the separator and provide strength as well.

However, the stretched separator has a tendency to shrink in an opposite direction to its stretched direction. Particularly, as the temperature increases by an internal or external factor of the battery, the separator may further shrink, which may cause a short circuit of the battery and the like. By this reason, in a case of uniaxial stretch, the separator may have a longer length than those of both electrodes placed at both sides of the separator such that a surplus separator extends beyond the edges of the both electrodes while considering a stretched direction or a consequent shrink direction. Similarly, in a case of biaxial stretch, the separator may have a longer length than those of both electrodes in a more stretched direction or a consequent shrink direction.

According to another aspect of the present disclosure, a secondary battery including a cathode, an anode, and the above-described separator interposed between the cathode and the anode is provided. Particularly, the secondary battery may include a lithium secondary battery including, for example, a lithium metal secondary battery, a lithium ion secondary battery, a lithium polymer secondary battery, or a lithium ion polymer secondary battery.

The cathode and the anode may be easily produced by a process and/or a method known in the art pertaining to the present disclosure.

The cathode is produced in a manner of binding a cathode active material to a cathode current collector by a traditional method known in the art. In this instance, the cathode active material may be a typical cathode active material that can be commonly used in a cathode of an electrochemical device, and as a non-limiting example, includes $LiCoO_2$, $LiNiO_2$, $LiMnO_2$, $LiMn_2O_4$, $Li(Ni_aCo_bMn_c)O_2$ ($0<a<1$, $0<b<1$, $a+b+c=1$), $LiNi_{1-y}Co_yO_2$, $LiCo_{1-y}Mn_yO_2$, $LiNi_{1-y}Mn_yO_2$ (here, $0 \leq Y<1$), $Li(Ni_aCo_bMn_c)O_4$ ($0<a \leq 2$, $0<b<2$, $a+b+c=2$), $LiMn_{2-z}Ni_zO_4$, $LiMn_{2-z}Co_zO_4$ (here, $0<Z<2$), $LiCoPO_4$, $LiFePO_4$, and mixtures thereof. Also, as the cathode current collector, a foil made from aluminum, nickel, or a combination thereof may be used.

The anode is produced in a manner of binding an anode active material to an anode current collector by a traditional method known in the art. In this instance, the anode active material may be, for example, carbons including non-graphitizable carbon, graphite-based carbon, and the like; composite metal oxides including $Li_xFe_2O_3$ ($0 \le x \le 1$), $Li_xWO_2$ ($0 \le x \le 1$), $Sn_xMe_{1-x}Me'_yO_z$(Me: Mn, Fe, Pb, Ge; Me': Al, B, P, Si, elements of Group 1, 2, and 3 in the periodic table, halogen; $0 < x \le 1$; $1 \le y \le 3$; $1 \le z \le 8$); lithium metals; lithium alloys; silicon-based alloys; tin-based alloys; oxides including SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, and the like; conductive polymers including polyacetylene and the like; Li—Co—Ni-based materials; and the like. Meanwhile, as the anode current collector, stainless steel, nickel, copper, titan, or alloys thereof may be used.

Also, an electrolyte which may be inserted between the electrode and the separator may be a salt containing ions represented by $A^+B^-$, in which $A^+$ includes alkali metal cations such as $Li^+$, $Na^+$, $K^+$, or combinations thereof, and $B^-$ includes anions such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$, or combinations thereof, is dissolved or dissociated in an organic solvent including, but not limited to, propylene carbonate (PC), ethylene carbonate (EC), diethyl carbonate (DEC), dimethyl carbonate (DMC), dipropyl carbonate (DPC), dimethylsulfoxide, acetonitrile, dimethoxyethane, diethoxyethane, tetrahydrofuran, N-methyl-2-pyrrolidone (NMP), ethylmethylcarbonate (EMC), gamma butyrolactone (γ-butyrolactone), or mixtures thereof.

Injection of the electrolyte may be performed in a proper step among a battery fabrication process based on a manufacturing process and required physical properties of a final product. As a process of applying the separator of the present disclosure to a battery, a lamination/stacking process and a folding process as well as a general winding process may be contemplated.

FIG. 1 is a flowchart illustrating a process of manufacturing a porous separator according to an exemplary embodiment. Referring to FIG. 1, a method of manufacturing a porous separator according to another aspect of the present disclosure includes (S1) forming an extruded sheet, (S2) forming a film, and (S3) forming a porous separator.

In the step S1, a polymer and an elastic material of which types are selected based on an intended separator are mixed, and a mixture is extruded to form an extruded sheet.

Description of the polymer and the elastic material is the same as that of the porous separator described in the foregoing.

Among the exemplary elastic materials, an elastomer such as a polyolefin elastomer generally has a low melting temperature $T_m$. When the elastic material in excess is mixed with the polymer, a thermal shrinkage ratio of a resulting separator may increase. In contrast, when the elastic material is used in an excessively small amount, it is impossible to achieve a desired degree of elongation and difficult to improve a high yield strain on a stress-strain (S—S) curve.

For these reasons, a mix ratio between the polymer and the elastic material is preferably about 95:5 to about 60:40, or about 90:10 to about 70:30 based on a weight ratio.

The mixture of the polymer and the elastic material is extruded through an extruder. The extruder is not limited to a specific type of extruder, and may be an extruder generally used in the art, as a non-limiting example, an extruder equipped with a T-die or a tubular die. The extrusion process may be performed at a conventional extrusion temperature, but preferably in a temperature range of "the melting temperature of the polymer + about 10° C." to the melting temperature of the polymer + about 100° C.". If the extrusion process of the mixture is performed at a temperature beyond or below this range, disadvantageously, a thermal degradation reaction of the polymer may occur, which makes molding difficult, and physical properties of a resulting film deteriorate. Through the extrusion process, an extruded sheet is formed.

In the step S2, annealing and stretching processes are performed on the extruded sheet formed in the step S1.

The annealing process may use a method of contacting the extruded sheet with a heated metal plate, a method of heating the extruded sheet in an oven while unwinding the extruded sheet from a roller inside or outside of the oven, a method of heating the extruded sheet by ultraviolet radiation, or a method of heating a roll in an oven after winding the extruded sheet around the roll together with another film, however the present disclosure is not limited in this regard.

Here, an annealing temperature may be set in a range of temperatures lower than the melting temperature of the polymer being used, for example, from a temperature lower than the melting temperature to the melting temperature of the polymer, and the annealing may be performed while changing the temperature gradually. Also, when annealing is performed, stretching may be performed in a range of about 0% to about 20%, preferably in a range of about 0% to about 10% based on a length of the extruded sheet to increase an elastic recovery rate of the film. If the annealing temperature is higher than or equal to the melting temperature of the polymer, a structure of the polymer used in the present disclosure melts and breaks, and when cooled, a non-oriented structure is formed. Accordingly, interconnected pores may not be generated in the film during the stretching process. Preferably, an annealing time is about 30 seconds or longer. If the annealing time is less than 30 seconds, it will not suffice in annealing the extruded sheet, resulting in a minor increase in elastic recovery rate.

The stretching process is performed through a general stretching method used in the art. This stretching method may include low-temperature stretching and/or high-temperature stretching using a general stretching machine used in the art. As a non-limiting example, the stretching machine may include a successive biaxial stretching machine. The stretched film may have, for example, an improved mechanical strength.

The stretching process is performed in a machine direction (MD) or a longitudinal direction, and/or a transverse direction (TD) or a perpendicular direction. By performing the stretching process in all or either of the directions, a tensile strength in the corresponding direction may be increased. If necessary, during the stretching process, the separator according to the present disclosure may be stretched in the machine direction (MD) and/or the transverse direction (TD) independently (for example, uniaxial stretching), or simultaneously or in a sequential order (for example, biaxial stretching).

In the step S3, the stretched film of the step S2 is heat-set by thermal treatment. By the heat-setting, a porous separator is formed.

To obtain a separator having a finally desired permeability, the stretched film is heat-set. Particularly, to reduce a shrinkage rate of a final film, the heat-setting of the stretched-relaxed film by the previous step is performed to eliminate the remaining stress.

The heat setting is used to forcibly eliminate the tendency of the film to shrink and relieve the remaining stress, by fixing the film for a predetermined period of time in such a state of being subject to tension at a temperature lower than or equal to the melting temperature of the polymer being used and by applying heat thereto. In the heat setting, high temperature is advantageous in reducing a shrinkage rate, but when the temperature is excessively high, the film only partially melts, resulting in the clogging of the formed pores and consequently a reduction in permeability. The heat setting temperature may be, for example, but not limited to, in a range of "the melting temperature of the polymer minus about 80° C." and "the melting temperature of the polymer minus about 5° C.".

The above steps are only illustrated to describe a process of manufacturing a porous separator having optimal physical properties, and a portion of the steps may be omitted or an additional process may be added depending on desired final physical properties, and among the steps, the order of some of the steps may be changed.

The pores in the separator may be generated in a desired range of porosity and/or permeability, for example, a porosity greater than or equal to 35% and/or a permeability less than or equal to about 300 sec/100 cc through 15 μm thickness.

Hereinafter, embodiments of the present disclosure will be described in detail. The embodiments of the present disclosure, however, may take several other forms, and the scope of the present disclosure should not be construed as being limited to the following examples. The embodiments of the present disclosure are provided to more fully explain the present disclosure to those having ordinary knowledge in the art to which the present disclosure pertains.

EXAMPLE

Example 1

30 g of castor oil as a surfactant was added to a resin mixture of 1.8 kg of polypropylene (JPP, FY6H) and 0.2 kg of ethylene-octene copolymer (LG Chem., Lucene LC100, Tm: 96° C.), mixed in a twin screw extruder, and pelletized. A film was manufactured by melting the pellets in a single screw extruder equipped with a T-die and casting on a cooling roll. To stabilize a crystalline structure of the manufactured film, the film was kept in an oven of about 110° C. for 60 minutes, and after a porous film was produced by uniaxially stretching the film in MD at 90° C. using a roll stretching machine at such a stretch ratio five times its original length, heat setting was performed by causing the porous film to thermally shrink by 20% in MD using a 133° C. roll, thereby obtaining a 20 μm thick separator having micro-pores.

Example 2

A separator was obtained by manufacturing using the same method as Example 1, except that 1.6 kg of polypropylene (JPP, FY6H) and 0.4 kg of polypropylene elastomer (LG Chem., Lucene LC100, Tm: 96° C.) were used instead of 1.8 kg of polypropylene (JPP, FY6H) and 0.2 kg of polypropylene elastomer (LG Chem., Lucene LC100, Tm: 96° C.).

Comparative Example

A separator was obtained by manufacturing using the same method as Example 1, except that 2.0 kg of polypropylene (JPP, FY6H) was used instead of 1.8 kg of polypropylene (JPP, FY6H) and 0.2 kg of polypropylene elastomer (LG Chem., Lucene LC100, Tm: 96° C.).

Comparative Experiment

TABLE 1

Result of comparative experiment on elongation at break

| | Elongation at break (%) |
|---|---|
| Example 1 | 320 |
| Example 2 | 375 |
| Comparative example 1 | 120 |

The elongation at break was measured under the temperature condition of 20° C.±2 and relative humanity condition of 65±2% using separator specimens having a size of 5 cm×5 cm obtained in Examples 1 and 2 and Comparative example 1. As shown in Table 1, the separators manufactured in Examples 1 and 2 exhibited an elongation at break greater than or equal to 300%. However, it was found that the separator manufactured without a polypropylene elastomer in Comparative example 1 had an elongation at break of 120% which is even lower than those of Examples 1 and 2.

What is claimed is:

1. A porous separator comprising a mixture of an elastic material and a polymer resin,
    wherein, in the mixture, the elastic material comprises an elastic copolymer including ethylene-octene copolymer present in an amount of 5 wt % to less than 10 wt % and the polymer resin comprises polypropylene present in an amount of more than 90 wt % to 95 wt %,
    wherein, in the mixture, the elastic material is uniformly dispersed in the polymer resin,
    wherein a value of elongation at break in a low tensile strength direction at room temperature is greater than or equal to 250%, and
    wherein the porous separator is uniaxially stretched.

2. The porous separator according to claim 1, wherein the uniaxial stretch is carried out in a machine direction (MD).

3. A secondary battery comprising a cathode, an anode, and a porous separator according to claim 1 interposed between the cathode and the anode.

4. The secondary battery according to claim 3, wherein the secondary battery is a lithium secondary battery.

* * * * *